July 24, 1951   H. L. BOWDITCH   2,561,970
RATIO ADJUSTMENT MECHANISM
Filed May 17, 1949   2 Sheets-Sheet 1
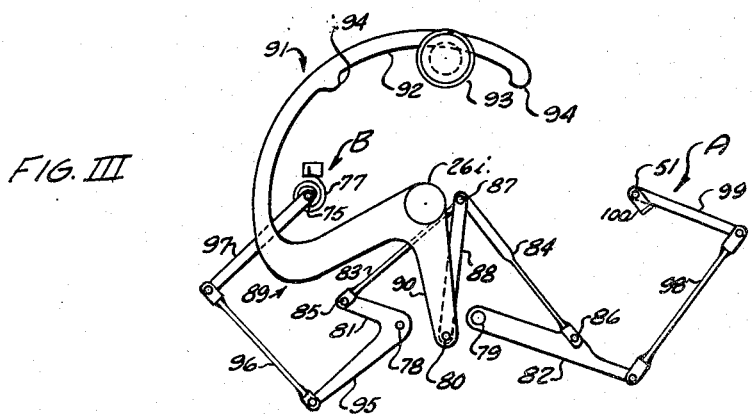
FIG. III
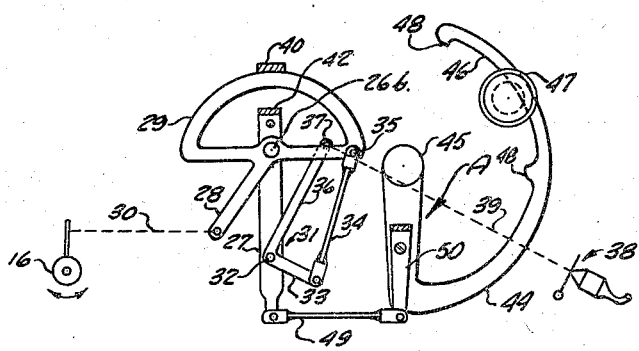
FIG. IV
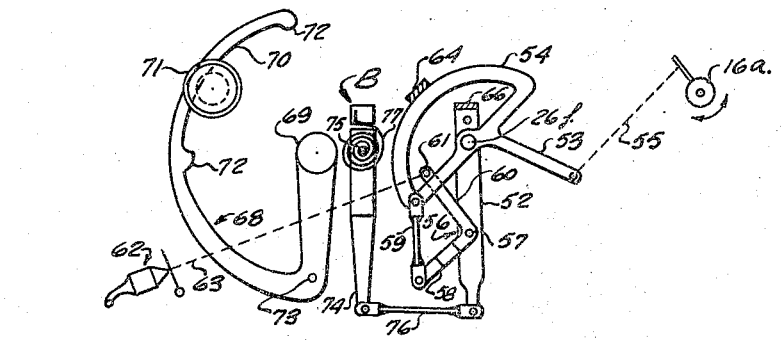
FIG. V
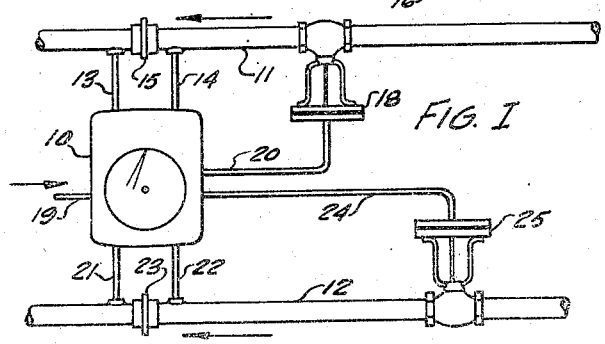
FIG. I
INVENTOR.
HOEL L. BOWDITCH
BY
Curtis, Morris & Safford July 24, 1951 H. L. BOWDITCH 2,561,970
RATIO ADJUSTMENT MECHANISM
Filed May 17, 1949 2 Sheets-Sheet 2
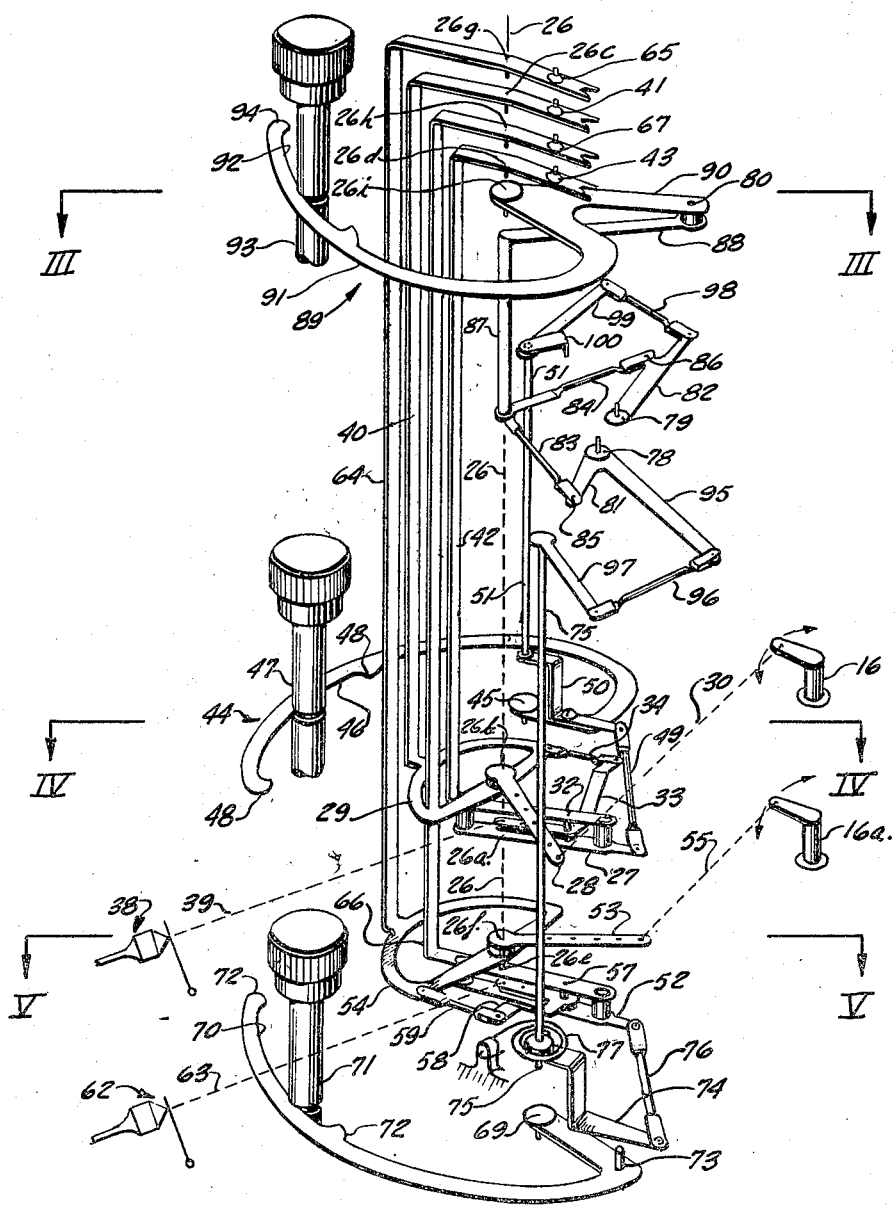
FIG. II
INVENTOR.
HOEL L. BOWDITCH
BY
Curtis, Morris & Safford Patented July 24, 1951

2,561,970

UNITED STATES PATENT OFFICE 2,561,970

RATIO ADJUSTMENT MECHANISM

Hoel L. Bowditch, Foxboro, Mass., assignor to The Foxboro Company, Foxboro, Mass., a corporation of Massachusetts Application May 17, 1949, Serial No. 93,641

1 Claim. (Cl. 74—1)

This invention relates to industrial process control instruments and has particular reference to an instrument by means of which two process variables are each separately and automatically controlled to their own set points.

An object of this invention is to provide an instrument in which two such set points are connected by a ratio mechanism so that the desired value of the variables, as represented by their set points, may be adjusted together while maintaining a desired ratio therebetween.

Further objects will be apparent from the following description and claim taken in conjunction with the accompanying drawings.

In the past, one arrangement of control instruments was to have one control instrument associated with one process variable and another control instrument associated with another process variable, so that a variation from set point in one process variable did not cause a compensating variation in the set point of the other process variable. The ratio between the desired values of the process variables as represented by the relation between their set points was set by separate adjustment of the instruments, with the ratio determined by calculation. Further adjustment of the set points again necessitated calculation of the desired values or set point positions needed to maintain the desired ratio.

In this invention, this necessity for calculation is avoided. The two separately operating control units are included in one instrument and connected by a ratio linkage for set point adjustment purposes. In this arrangement, as in the past, variation of one process variable from its set point does not cause the other process variable to vary from its set point, but adjustment of one set point causes in-ratio adjustment of the other set point, without calculation.

Another arrangement which has been used in the past is to make one process variable follow the variations of another process variable, in ratio therewith. This arrangement has the disadvantage that when the process is started up, the following variable, since it depends on the leading variable for its set point, achieves its set point with an appreciable time lag. Such time lags may be very damaging in a multiple controlled process, because an upset could be caused, rendering the whole process unstable.

This invention has an advantage over such a structure in that no such time lag is involved because neither of the process variables follows the lead of the other in variation from set point. The connection between the control devices of this invention is one of ratioed adjustment of the set points.

A further advantage of the structure of this invention is that the ratio mechanism is adjustable to change its ratio and consequently the ratio between the set points.

A further advantage is that the ratio mechanism may be operatively disconnected from the control devices so that the set points may be independently adjusted.

Further, this invention provides an adjustable member associated with one of the control devices which is operable either as a means for adjusting the set point thereof when the ratio mechanism is disconnected or as a maximum set point limit stop to prevent adjustment of the set point thereof above this adjusted maximum by said ratio setting mechanism.

In the drawings:

Figure I is an illustration of a control instrument installation of the type in which the mechanism of this invention may be used;

Figure II is a perspective view of the mechanism of this invention with the vertical dimension extended and supporting structure omitted in order to show more clearly the functions and relative positions and locations of the various parts of the mechanism;

Figure III is a plan illustration of the ratio linkage mechanism of this invention taken approximately as on line III—III of Figure II;

Figure IV is a plan illustration taken approximately as on line IV—IV of Figure II, of a differential linkage for controlling one of the process variables to a set point, and it shows an arrangement for adjusting the mechanism to vary the location of the set point; and, Figure V is a plan illustration taken approximately as on line V—V of Figure II, of a differential linkage for controlling the other of the process variables to its set point, and it shows an arrangement for adjusting the mechanism to vary the location of the set point.

Ratio controllers have a wide variety of useful applications in industry. They may be used to control flow of process ingredients to a process, or they may otherwise control a process by maintaining a desired ratio between flows, pressures, temperatures, liquid levels, or a pressure and a temperature, or any other combination of these process variables or other like variables. Also such controllers may be used as dividers from a supply to different users, as in a water supply being divided between towns.

The mechanism of this invention may be used in any of these combinations or uses and is particularly useful when it is desired to change the set points of the process variables without disturbing the ratio therebetween, by using a single, simple adjustment. For example, if the process variables are hot and cold water, assuming constant temperatures in each, flowing at a given ratio, with the hot water at 20 gallons per unit of time, and it is desired to speed up the process to finish by the end of a working day, a single adjustment will change the 20 gallons to 33 gallons, for example, and the gallons per unit time of the cold water will be increased as necessary to maintain the original ratio with the new hot water value, or set point, of 33 gallons.

It will be seen then, that the mechanism of this invention is not primarily concerned with maintaining the hot water flow at a set point of 20 or 30 gallons, or at whatever value the set point represents, but rather, this is a mechanism for adjustment, in ratio, of set points of different process variables. The variables might be two outlets from the same supply tank, or they might be the temperature and pressure of a batch process.

The mechanism accomplishes, in effect, the joining of two separate control instruments, each of which is controlling a separate process variable to a separate set point, by a ratio linkage so that the set points may be adjusted together by a single adjustment, with their ratio maintained, or the ratio may be disconnected and the set points adjusted separately.

Referring to Figure I, the control instrument of this invention is indicated at 10, and the process variables controlled by this instrument are shown as in flow lines 11 and 12. The flow lines are shown independently, the apparatus shown thus being a unit which may be applied to a variety of processes, depending on the arrangement of input or output of this unit. The flow of line 11 is determined by pressure take-offs 13 and 14 on opposing sides of an orifice unit 15. The pressure take-offs 13 and 14 are both led to a manometer (not shown) on the back of the instrument 10. The resultant motion from a float within the manometer is transmitted into the instrument 10 through a shaft 16, Figure II, in a pressure tight bearing, in the form of rotation of that shaft. The effect of such actuation of the shaft 16 is transmitted through a part of the mechanism of this invention in the instrument 10, to a pressure amplifier as operated by a nozzle and flapper unit as at 38 in Figure II, the output of which operates a valve 18 in the flow line 11. Thus the flow variable of the flow line 11 is controlled to a set point through the action of the pressure determining arrangement as described above, in conjunction with the control instrument 10, which has an operating air supply 19, and the control valve 18 through the output 20.

In like manner the flow variable of the flow line 12 is controlled to a set point, through the operation of pressure take-offs 21 and 22, an orifice unit 23, a pneumatic output line 24 and a control valve 25.

There are three main subdivisions of the mechanism of this invention. These subdivisions are illustrated in Figures III, IV, and V and their locations in the mechanism are indicated in Figure II by the reference lines III—III, IV—IV, and V—V. As stated in the drawing description, Figure IV is a standard differential linkage for controlling a primary process variable to a set point; Figure V is another standard differential linkage for controlling the secondary process variable to another set point; and Figure III is a ratio linkage assembly connecting the linkages of Figures IV and V.

As in Figure II, the mechanism operates mainly about a vertical center line 26. The differential linkage of Figure IV operates about the center line 26 Figure II as a base pivot. This differential linkage comprises three main elements, namely, a set point arm 27, pivoted at 26a on the center line 26 and movable about this pivot to change the location of the set point to make it represent a different value of the process variable which the linkage controls; an actuated arm 28 and perforated sector 29 integral therewith and pivoted midway of the sector base at 26b on the center line 26, this being the unit which is operated from the manometer rotated shaft 16 through a connection indicated by the dotted line 30; and an actuating bell crank lever 31, pivoted on the set point arm 27 as at 32, a substantial distance away from the center line 26. One leg, 33, of the lever 31 is connected by a link 34 to an end of the sector base as at 35. The other leg, 36, of the lever 30, extends generally toward the center line 26 and the length of the leg 36 is sufficient to allow a connection point 37 thereon to coincide with the center line 26 so that the connection point 37 will have the same zero position for each position of the set point arm 27 as it is moved about its pivot 26a. Note that the plane of sector 29 is above the plane of set point arm and the bell crank leg 33 extends upwardly to make its connection with the link 34.

The bell crank lever 31 operates a flapper-nozzle unit 38 through a connection, dotted line 39, from the connection point 37. The sector 29 has a vertical arm 40 fixed thereto at the midpoint of the sector arc, and extending, Figure II, upwardly, parallel with the center line 26, to terminate in a forwardly bent pen mounting 41, pivoted on the center line as at 26c, for holding a pen for movement across a chart to record the movements of the rotatable shaft 16 to provide a record of the variations of the process variable from its set point.

Also, the set point arm 27 has a vertical arm 42 fixed thereto at its inner end and extending upwardly, parallel with the center line 26 to terminate in a forwardly bent indicator mounting 43 pivoted on the center line as at 26d, for holding an indicator for movement across the chart to indicate the set point position as represented by the position of the set point arm 27 about its pivot 26a.

Thus as the shaft 16 is rotated the sector 29 is moved about its pivot, and the link connection 34 transmits this motion to the bell crank 31, causing it to move about its pivot 32 to operate the flapper-nozzle unit 38. This action occurs without movement of the set point arm 27, and a variation in the process variable operates through this device to the valve in the process variable line to compensate therefor, to control the variable to its set point as represented by the position of the set point arm 27.

Adjustment means is provided for moving the set point arm 27 about its pivot 26a to different set point positions, in the form of a C arm 44 pivoted at 45 in parallelism with the center line 26. The C arm 44 has an inner contour 46 on its free end portion which is approximately the curve of a radius end with respect to the pivot 45. An adjustment shaft 47 frictionally engages the contour 46 so that rotation of the shaft 47 causes the C arm to move about its pivot 45, and there are enlargements 48 on the C arm for engaging the shaft 47 to limit the pivotal movement of the C arm. A link connects the C arm and the set point arm 27 between the outer end of the set point arm and an intermediate portion of the C arm so that adjustment of the shaft 47 results in adjustment of the set point arm. A connection member 50 secured to the C arm 44 extends upwardly and back, Figure II, to connect with a vertical shaft 51 as a lead to the ratio mechanism of Figure III. Rotation of the adjustment shaft 47 may thus be transmitted to the ratio mechanism.

The differential linkage of Figure V, as the second automatic set point control for the second process variable is constructed and operates substantially in the same form and manner as the linkage of Figure IV described above. It has the three main elements, a set point arm 52, pivoted at 26e, Figure II, on the center line 26 and movable about this pivot to change the location of the set point to make it represent a different value of the second process variable; an actuated arm 53 and perforated sector 54 integral therewith and pivoted midway of the sector base at 26f on the center line 26, this being the unit which is operated from the second manometer rotated shaft 16a through a connection indicated by the dotted line 55; and an actuating bell crank lever 56, pivoted on the set point arm 52 as at 57, a substantial distance away from the center line 26. One leg 58, of the bell crank is connected by a link 59 to an end of the sector base. The other leg, 60, of the bell crank, extends generally toward the center line 26 and the length of the leg 60 is sufficient to allow a connection point 61 thereon to coincide with the center line 26 so that the connection point 61 will have the same zero position for each position of the set point arm 52 as it is moved about its pivot 26e. Here, as in the structure of Figure IV, the sector is above the plane of the set point arm and the bell crank leg 58 extends upwardly to make its connection with the link 59.

The bell crank lever 56 operates a flapper-nozzle unit 62 through a connection, dotted line 63, from the connection point 61. The sector 54 has a vertical arm 64 fixed thereto at the midpoint of the sector arc and extending, Figure II, upwardly, parallel with the center line 26 to terminate in a forwardly bent pin mounting 65, pivoted on the center line as at 26g, for holding a pen for movement across the chart to record the movements of the rotatable shaft 16a to provide a record of the variations of the second process variable from its set point.

Also, the set point arm 52 has a vertical arm 66 fixed thereto at its inner end and extending upwardly, parallel with the center line 26 to terminate in a forwardly bent indicator mounting 67 pivoted on the center line as at 26h, for holding an indicator for movement across the chart to indicate the set point position as represented by the position of the set point arm 52 about its pivot 26e.

Thus, as the shaft 16a is rotated, the sector 54 is moved about its pivot, and the link connection 59 transmits this motion to the bell crank 56, causing it to move about its pivot 57 to operate the flapper-nozzle unit 62. This action occurs without movement of the set point arm 52, and a variation in the second process variable operates through this device to the valve in the second process variable line, to compensate therefor, to control the second variable to its set point as represented by the position of the second set point arm 52.

Adjustment means is provided for moving the set point arm 52 about its pivot 26e to different set point positions, in the form of a C arm 68, pivoted at 69 in parallelism with the center line 26. The C arm 68 has an inner contour 70 on its free end portion which is approximately radial with respect to the pivot 69. An adjustment shaft 71 frictionally engages the contour 70 so that rotation of the shaft 71 causes the C arm 68 to move about its pivot 69 and there are enlargements 72 on the C arm for engaging the shaft 71 to limit the pivotal movement of the C arm. This C arm is not connected with the set point arm 52 but has an upright pin 73 mounted thereon so that as the C arm is moved about its pivot, the pin 73 may come in contact with an arm 74 which is secured to a vertical pivot shaft 75 adjacent the C arm pivot and which has a link connection 76 with the set point arm 52. The shaft 75 is a connection with and rotatable by, the ratio linkage of Figure II. It should be noted that the set point arm 52 is the member whose movement changes the set point, and that the C arm and arm 74 are means for moving the set point arm.

In the operation of the mechanism of this invention, the ratio linkage may be operatively connected or disconnected with respect to the two differential mechanisms, as it is desired to adjust the set points in ratio or individually. When the ratio is connected, the C arm 68 is pivoted back out of the way, and is not used. A spiral spring 77 is mounted about the pivot shaft 75 to bias the arm 74 against the pin 73 if the ratio linkage is disconnected, or if it is connected, to act through the linkage mechanism to maintain a separable spring pressed contact connection, indicated generally at A in Figure III, between the ratio linkage and the differential linkage of Figure IV. A is also an indication in Figures III and IV of the location of the connection between the mechanism therein, and B is an indication in Figures III and V of the location of the connection between the mechanisms of those figures.

Referring to Figure III, the ratio linkage operates about two pivots 78 and 79 which are permanently fixed, and one pivot 80, which is temporarily fixed for any one ratio setting. A pair of oppositely and laterally extending arms 81 and 82 are mounted on the pivots 78 and 79 and a second pair of arms 83 and 84 are pivotally mounted, one on each of the arms 81 and 82 at points 85 and 86 thereon such that the distance between the pivots 78 and 85 is the same as that between the pivots 79 and 86. The arms 83 and 84 extend backwardly and inwardly to meet at a pivotal connection therebetween on an axis shaft 87. Another arm 88 extends backwardly from the temporarily fixed pivot 80 and this arm is also pivoted on the axis shaft 87. The arms 83 and 84 are equal in length and in the one to one ratio as shown, the pivot 80 is between and equidistant from the fixed pivots 78 and 79. With this arrangement of positions and relative dimensions, a movement of the arm 82 about the pivot 79 moves the axis shaft 87 about the pivot 80 as a center and the arm 81 is moved about its pivot 78 an amount equal to the movement of the arm 82.

Adjustment of the pivot 80 to a different position results in a different ratio arrangement. Adjustment laterally in the direction of the pivot 86 results in a ratio in which a movement of the arm 82 is amplified in arm 81 and adjustment laterally in the direction of the pivot 85 results in a ratio in which a movement of the arm 82 is reduced in arm 81.

Adjustment of the pivot 80 is accomplished by a C lever 89 which is pivoted on the axis 26 as at 26i, with a forwardly extending leg 90 pivotally connected to the arm 88 on the pivot 80, and with a C portion 91 extending out and back from the pivot 26i. This C portion has an inner contour 92 on its free end portion which is approximately radial with respect to the pivot 26i. An adjustment shaft 93 frictionally engages the contour 92 so that rotation of the shaft 93 causes the C lever to move about its pivot 26i so as to adjust the pivot 80 about the pivot 26i as a center. There are enlargements 94 on the C portion 91 for engaging the shaft 93 to limit the pivotal movement of the C lever.

Connection of the ratio linkage with the linkage of Figure V is accomplished through an integral angled portion of the lever 81, a link 96 and an arm 97 which is secured to the pivot shaft 75, see Figures II, III, and V.

Connection of the ratio linkage with the linkage of Figure IV is accomplished through an extension of the arm 82, and a link 98 between this extension and an arm 99 which is pivoted on the vertical shaft 51, see Figures II, III, and IV. A stop member 100 is secured to the top end of the shaft 51 for movement therewith and bears against the arm 99 in the spring pressed operative connection contact previously referred to as at A, this action deriving from the spiral spring 77.

Operative disconnection of the ratio linkage so that the set point adjustments may be made independently of each other is accomplished by moving the arm 99 about its pivot, away from the stop 100. There are two ways of doing this. The ratio mechanism may be adjusted to an extreme position of infinite ratio by moving the pivot 80 laterally in the direction of the pivot 86 as far as it will go. The other way of disconnecting the ratio linkage is by operating the set point adjustment of Figure V. The pin 73 engages the arm 74 so as to rotate the shaft 75 against the action of the spring 77. This motion is transmitted through the ratio mechanism to separate the arm 99 from the stop 100. The mechanism of Figure IV is then adjusted without changing the set point of the Figure V structure, after which the C arm of Figure V is backed off with the spring 77 causing the set point arm 52 to follow until the desired set point adjustment is reached.

An overrange protection is provided for a situation in which a small movement of the Figure IV structure is ratioed to produce an enlarged movement in the Figure V set point arm. To prevent the set point arm 52 from moving beyond the allowed scale range, the C arm 68 may be pivoted to a position in which the pin 30 will stop the set point arm travel although the set point arm of Figure IV may still continue, but without maintaining the ratio.

I claim:

In combination in an industrial process control unit, a first device, for automatically controlling a first process variable to a first set point, a set point member in said device movable to change said set point to make it represent a desired value of said process variable, set point adjustment means associated with said device for moving said member, a second device, for automatically controlling a second process variable to a second set point, a set point member in said second device movable to change said second set point to make it represent a desired value of said second process variable, an adjustable ratio linkage operatively connecting said movable set point members, whereby operation of said adjustment means changes both of said set points in ratio with each other in accordance with the ratio of said linkage, said linkage being operatively disconnectable from said set point members by adjustment of said ratio linkage to an extreme position, and an adjustment member, movable into and out of engagement with said second device set point member and operable either as a means for moving said second device set point member when said linkage is disconnected, or as a means for stopping, as a limit stop, the movement of said second device set point member as imparted through said linkage.

HOEL L. BOWDITCH.

REFERENCES CITED

The following references are of record in the file of this patent:

UNITED STATES PATENTS

| Number | Name | Date |
| --- | --- | --- |
| 1,844,415 | Wilhjelm | Feb. 9, 1932 |
| 1,921,145 | Albright | Aug. 8, 1933 |
| 2,345,524 | Ziebolz | Mar. 28, 1944 |